(12) United States Patent
Di Tanna et al.

(10) Patent No.: US 12,049,278 B2
(45) Date of Patent: *Jul. 30, 2024

(54) RIDE-ON SADDLE VEHICLE WITH AN INTERFACE FOR INTEGRATING THE ON-BOARD INSTRUMENTS WITH A MOBILE DEVICE

(71) Applicant: PIAGGIO & C. S.P.A., Pontedera (IT)

(72) Inventors: Onorino Di Tanna, Pontedera (IT); Mario Santucci, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 319 days.

This patent is subject to a terminal disclaimer.

(21) Appl. No.: 17/614,645

(22) PCT Filed: May 26, 2020

(86) PCT No.: PCT/IB2020/054972
§ 371 (c)(1),
(2) Date: Nov. 29, 2021

(87) PCT Pub. No.: WO2020/240411
PCT Pub. Date: Dec. 3, 2020

(65) Prior Publication Data
US 2022/0227444 A1 Jul. 21, 2022

(30) Foreign Application Priority Data

May 31, 2019 (IT) .......................... 102019000007752

(51) Int. Cl.
*B62J 50/22* (2020.01)
*B62J 3/14* (2020.01)
*B62J 6/24* (2020.01)
*B62J 45/20* (2020.01)
*B62J 45/40* (2020.01)
(Continued)

(52) U.S. Cl.
CPC ................. *B62J 50/22* (2020.02); *B62J 3/14* (2020.02); *B62J 6/24* (2020.02); *B62J 45/20* (2020.02); *B62J 45/40* (2020.02); *B62J 50/225* (2020.02); *B62K 23/06* (2013.01)

(58) Field of Classification Search
CPC ..... B62J 50/22; B62J 45/20; B62J 3/14; B62J 6/24; B62J 45/40; B62K 23/06
See application file for complete search history.

(56) References Cited

U.S. PATENT DOCUMENTS 11,062,149 B2 * 7/2021 Seko ..................... B62J 45/40
2013/0234845 A1    9/2013 Kikuchi et al.
2023/0041105 A1 * 2/2023 Santucci ................ B60K 37/06

FOREIGN PATENT DOCUMENTS

NL         2018466 B1        3/2018
WO         2013154099 A1     10/2013
WO     WO-2021064799 A1 *   4/2021

* cited by examiner

*Primary Examiner* — Faye M Fleming
(74) *Attorney, Agent, or Firm* — McGlew and Tuttle, P.C.

(57) ABSTRACT

The vehicle is provided with a dashboard and with a housing in which a mobile device, for example a mobile phone or smartphone, can be inserted. An electronic control unit of the vehicle co-acts with the mobile device by means of an electronic interface, so as to provide the mobile device with information relating to the operation of the vehicle. In this way, the mobile device provides an integration of the on-board instruments of the vehicle, which completes the instruments available on the dashboard.

15 Claims, 4 Drawing Sheets

(51) Int. Cl.
*B62J 50/21* (2020.01)
*B62K 23/06* (2006.01)

RIDE-ON SADDLE VEHICLE WITH AN INTERFACE FOR INTEGRATING THE ON-BOARD INSTRUMENTS WITH A MOBILE DEVICE

TECHNICAL FIELD

The present invention relates to ride-on saddle vehicles, in particular motorcycles provided with a saddle. Embodiments described herein relate in particular to improvements to on-board instruments of motorcycles.

Background Art

All motorcycles are provided with on-board instruments, more or less advanced, according to the price level of the motorcycle and to the trim chosen by the customer purchasing it. Some instruments are mandatory by law and must be present on all motorcycles, regardless of model and trim chosen. Other instruments are optional and are only installed on some motorcycles, for example as a function of the customer's requests and/or of the category of motorcycle. These instruments can be very simple, but in some cases also particularly sophisticated.

The functions that can be required by on-board instruments of the motorcycle can vary over time, as technology advances, providing motorcycle manufacturers with increasingly advanced technological solutions at increasingly accessible costs. The on-board instruments of a vehicle that may be considered particularly sophisticated and advanced at the time of purchase are therefore prone to rapid obsolescence.

Moreover, the need to offer the market different configurations, also in the form of different trims of the same motorcycle, poses organizational and logistic problems for the manufacturer.

Therefore, it would be advantageous to provide instruments that entirely or in part overcome the limits and drawbacks of current instruments.

WO2013/154099 discloses a ride-on saddle vehicle comprising a handlebar connected to the front steered wheel. A dashboard with the on-board instruments is placed in front of the handlebar, in a fixed position relative to the frame of the vehicle. A housing for a portable terminal, such as a smartphone, which can interact with the on-board instruments of the vehicle, is integral with the handlebar. This configuration is only possible on vehicles of large size, in particular on large motorcycles which have a dashboard fixed to the frame of the vehicle.

NL2018466 discloses a ride-on saddle vehicle, in particular a scooter, with a seat for a double display provided on its handlebar. The first display, i.e. the first portion of display, is connected to a central controller, which shows on the first display, or portion of display, information relating to the vehicle and relating to driving. A second display, or display portion, is of the touch type and provides a graphical user interface (GUI) for the driver. The use of a portable terminal, such as a smartphone, is not envisaged.

SUMMARY OF THE INVENTION

To overcome or alleviate the drawbacks of the state of the art, a ride-on saddle vehicle is provided, comprising a frame, at least one rear drive wheel and at least one front steered wheel associated with a handlebar to control steering of the front steered wheel. The vehicle further comprises a first set di instruments, integrated with the handlebar. The vehicle also comprises an electronic control unit of the vehicle, connected to a plurality of electronic devices on board the vehicle. Advantageously, the vehicle comprises a housing associated with the handlebar for a mobile device of a user of the vehicle and an electronic interface adapted to interface the electronic control unit with a mobile device inserted in the housing. The electronic control unit is adapted to provide the mobile device, by means of the electronic interface, with information viewable on the mobile device and relating to a plurality of functions of the vehicle. In some embodiments, the electronic control unit is adapted to transfer commands or instructions given by means of the mobile device to devices on board the vehicle.

In the present context, reference will be made specifically to a motorcycle. This term, in the present description and in the appended claims generally means a ride-on saddle vehicle, which can have two, three or four wheels.

With the combination of dashboard and housing for a mobile device, interfaceable with the electronic control unit of the vehicle, it is possible to provide part of the instruments on the dashboard, and to use the mobile device as supplementary means to provide the user with additional instruments relative to those on the dashboard. By means of the electronic interface between electronic control unit of the vehicle and mobile device it is possible not only to transfer data from the vehicle to the mobile device, by means of which to provide the driver with information on the vehicle; it is also possible to use the mobile device (advantageously by means of a graphical user interface, of the mobile device) to act on the vehicle, for example giving commands or selecting functions. As will be explained below, this can advantageously be obtained using an interaction member between user and mobile device, which makes it unnecessary to use a touch screen of the mobile device.

By having the first set of instruments integrated in the handlebar, where the housing for the mobile device is also integrated, it is possible to expand and complete with a portable device the on-board instruments also on a vehicle of small size, for example a scooter, with a practical, inexpensive and compact solution.

Moreover, having both the first set of instruments and the mobile device integrated in the handlebar, the driver obtains greater visibility.

The mobile device, typically a smartphone or a tablet, in general comprises a screen on which to view information relating to the operation of the vehicle and of parts thereof, and relating to the route being traveled. Moreover, in some embodiments, the mobile device, with its graphical user interface (GUI), can allow communication with the electronic control unit entering commands or instructions, relating both to the way in which the data are presented on the screen, and relating to operation of the vehicle. For example, it is possible to use the mobile device as a tool for selecting an operating mode of the engine, of the suspensions, of the transmission or of other elements, components or assemblies of the vehicle In general, the electronic devices on board the vehicle comprise sensors for detecting data, parameters or conditions to be communicated to the driver. In some embodiments, the electronic devices on board the vehicle can comprise one or more transducers and one or more actuators. For example, the electronic devices can comprise transducers for setting an operating condition of the engine, of the transmission, of the suspensions or of other assemblies. The electronic devices can also comprise devices for switching on and off lights or other components of the vehicle.

Advantageously, in embodiments described herein, the housing and the dashboard are both placed on the handlebar of the vehicle and are preferably integral therewith. In advantageous embodiments, the dashboard and the housing are preferably placed one next to the other, so that the driver has all the instruments available in the same zone, for greater visibility and to allow all the instruments available, both those integrated in the dashboard and those implemented by means of the mobile device, to be checked simultaneously.

Advantageously, the housing can comprise mechanical retaining members of the mobile device and a transparent closure, which allows viewing of the screen of the mobile device when it is placed in the housing and protected by the closure. The closure can be provided with a door or cover, or the housing and the transparent closure can be integrated to form a pocket into which the mobile device can be inserted laterally.

In some embodiments, the following instruments can be provided on the dashboard fixed to the vehicle: speedometer, full beam warning light, position light warning light, indicator lights, low fuel warning light.

In some embodiments, the control unit is adapted to provide, by means of the electronic interface, the mobile device with information adapted to view, on a screen of the mobile device and by means of a graphical user interface, one or more of the following functions or information: a revolution counter, an odometer, a front fog lights warning light, a rear fog lights warning light, a dipped beam warning light, a fuel level indicator, an indicator of the tire pressure based on direct or indirect information, voyage data and the like. Measurement of the tire pressure can be direct, by means of pressure sensors, or indirect, by means of detection of the revolutions of the wheels of the vehicle. The voyage data can, for example, comprise instantaneous or average fuel consumption, average speed, length of the route traveled, etc.

The voyage data can be calculated by the electronic control unit based on signals coming from on-board electronic devices. For example, the average speed and average consumption can be calculated by the electronic control unit integrating the instantaneous speed or instantaneous consumption data, provided by a speed sensor and by a flow meter, respectively. In other embodiments, one, some or all the voyage data can be calculated by an application residing in the mobile device, based on instantaneous data provided by means of the electronic interface by the electronic control unit.

In addition to simple viewing of information coming from devices, sensors, transducers or other on-board instruments, the mobile device can interact with the electronic control unit also in order to give instructions or commands to the vehicle, or more in general in order to allow interaction between driver and vehicle. For this purpose, a graphical user interface of the mobile device, an interaction member between driver and mobile device, the electronic interface and the electronic control unit can be used in combination.

The interaction member allows the driver to interact with the mobile device without the need to use, for this purpose, the touch screen provided on the mobile device. In fact, the touch screen may not be accessible due to the cover that protects the mobile device when installed on the vehicle. An application installed on the mobile device allows the graphical user interface of the mobile device to be used by means of the interaction member, which can be mounted on the handlebar, advantageously close to the grips of the handlebar, so as to allow the driver to use the interaction member in safe driving conditions, without removing the hands from the handlebar. For example, the interaction member can comprise a plurality of buttons, or a joy-stick.

Advantageously, the control unit can be programmed to view, on a screen of the mobile device, a graphical user interface by means of which the user can set, by means of the interaction member, one or more functions, for example: the behavior of the engine (sport, comfort, eco . . . ); the behavior of the suspensions of the vehicle; enabling and disabling of a quick shift function; the behavior of the automatic transmission; management of multimedia contents of the mobile device; management of telephone calls or messaging. For the purposes indicated above, the electronic control unit can interact with an application installed in the mobile device.

As mentioned, the mobile device can be a smartphone or in general a device equipped with a SIM card, to provide telephone functions. The control unit can be adapted to send, by means of the mobile device, an emergency call as a function of signals coming from one or more sensors installed on the vehicle and interfaced with the control unit. For this purpose, it is possible to provide, for example, one or more accelerometers, one or more tilt sensors, or equivalent instruments.

BRIEF DESCRIPTION OF THE DRAWINGS

The invention will be better understood by following the description and accompanying drawings, which illustrate a non-limiting example of embodiment of the invention. More in particular, in the drawing.

DETAILED DESCRIPTION OF AN EMBODIMENT

Figure 1:
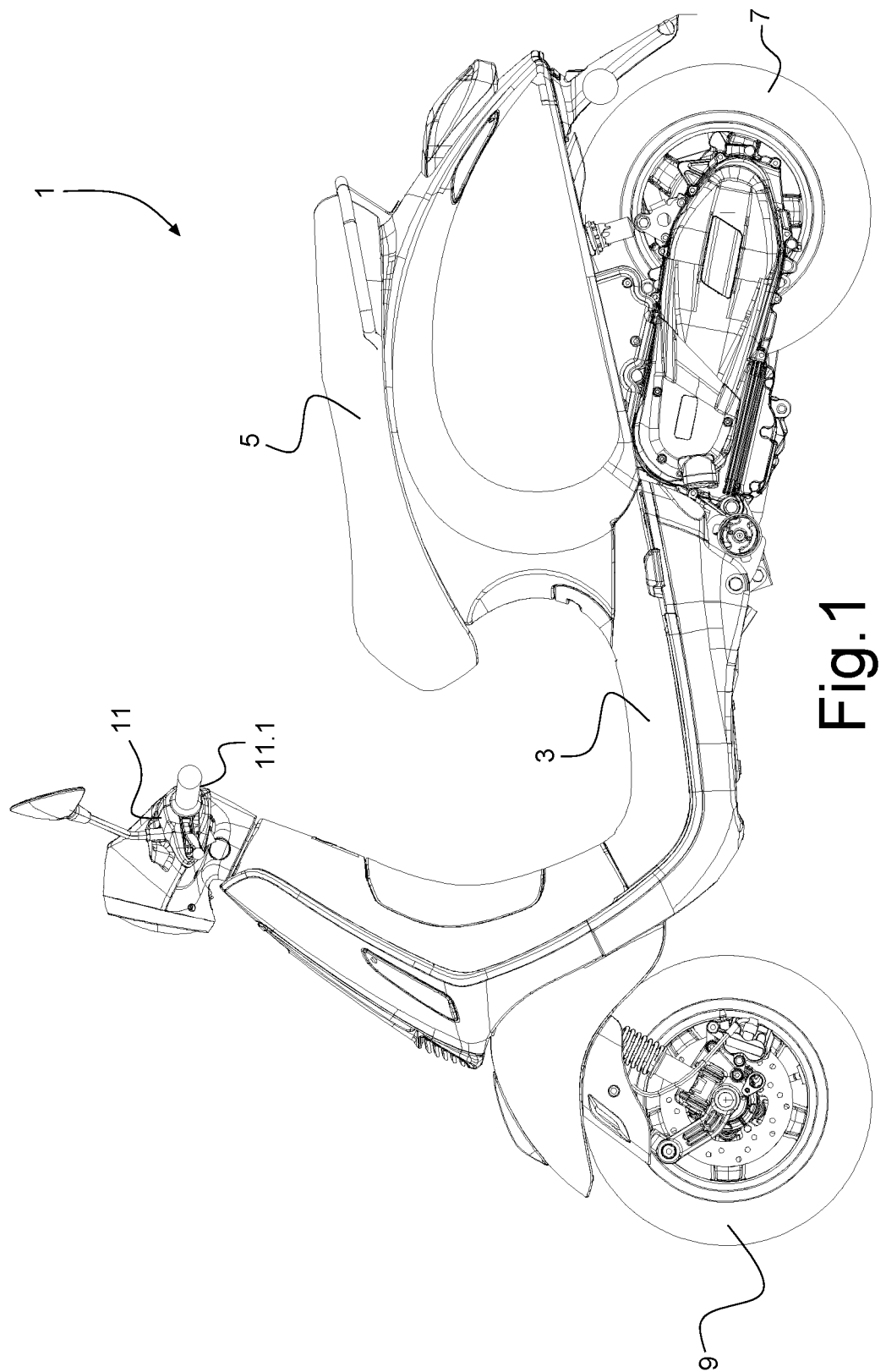
FIG. 1 shows a side view of a motorcycle.

FIG. 1 shows a view of a two-wheeled saddle motorcycle, in the case in hand a scooter, which can be provided with instruments according to the present invention. The motorcycle, indicated as a whole with 1, comprises a frame 3 with a saddle 5, a rear wheel 7 and at least one front steered wheel 9 controlled by a handlebar 11. It must be understood that the motorcycle represented is merely an example. The instruments described below can also be installed on different motorcycles, for example motorcycles with two or three wheels, three-wheeled scooters, quad bikes and the like.

Figure 2:
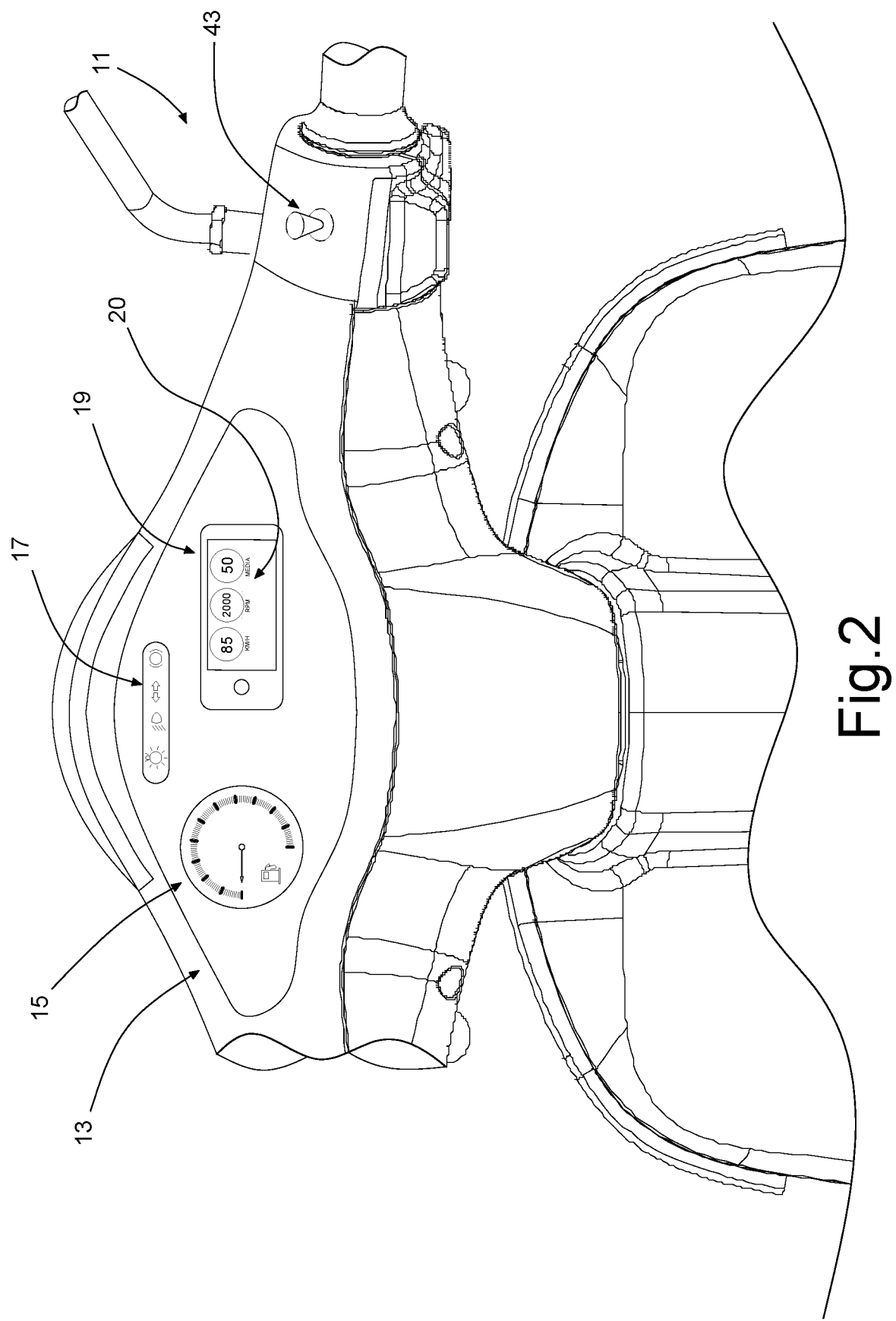
FIG. 2 shows a top view of the instruments of the motorcycle.

A panel on which a dashboard 13 is mounted is associated with the handlebar 11 of the motorcycle 1. The dashboard 13 comprises instruments for viewing and controlling various functions of the motorcycle 1. An embodiment of the dashboard 13 is shown in FIG. 2. By way of example, in FIG. 2 the dashboard 13 comprises a speedometer 15, a low fuel warning light, full beam and position light warning lights 17, and indicator lights.

In general, the instruments provided on the dashboard 13 can be limited to those indicated as mandatory by the current legislation in the country of sale and use of the motorcycle 1.

To allow the user of the vehicle to have available additional instruments, without impacting on the production cost of the motorcycle, advantageously the motorcycle 1, and more precisely an electronic control unit thereof, better described below, can be interfaced with a mobile device belonging to the user or owner of the motorcycle 1. The mobile device can be any device provided with viewing means and with the possibility of interfacing with the electronic control unit of the motorcycle 1. Typically, but not exclusively, the mobile device can be a smartphone.

Hereinafter, specific reference will be made to a smartphone, as mobile device provided with Internet connection. However, it must be understood that this type of mobile device, although currently preferred, could be substituted by other mobile devices with similar features. In some cases, a mobile device without an Internet connection could be used, although in this case some of the functions described herein would not be available.

As will be clear below, in order to be used in the context of the present invention, the mobile device will advantageously have some features and functions, which can also be provided on different mobile devices to a current smartphone.

In particular, advantageously the mobile device is provided with a possibility of interfacing with external electronics, in particular the electronic control unit of the vehicle, and is also provided with a screen on which a graphical user interface can be viewed, for the purposes described below.

Figure 3:
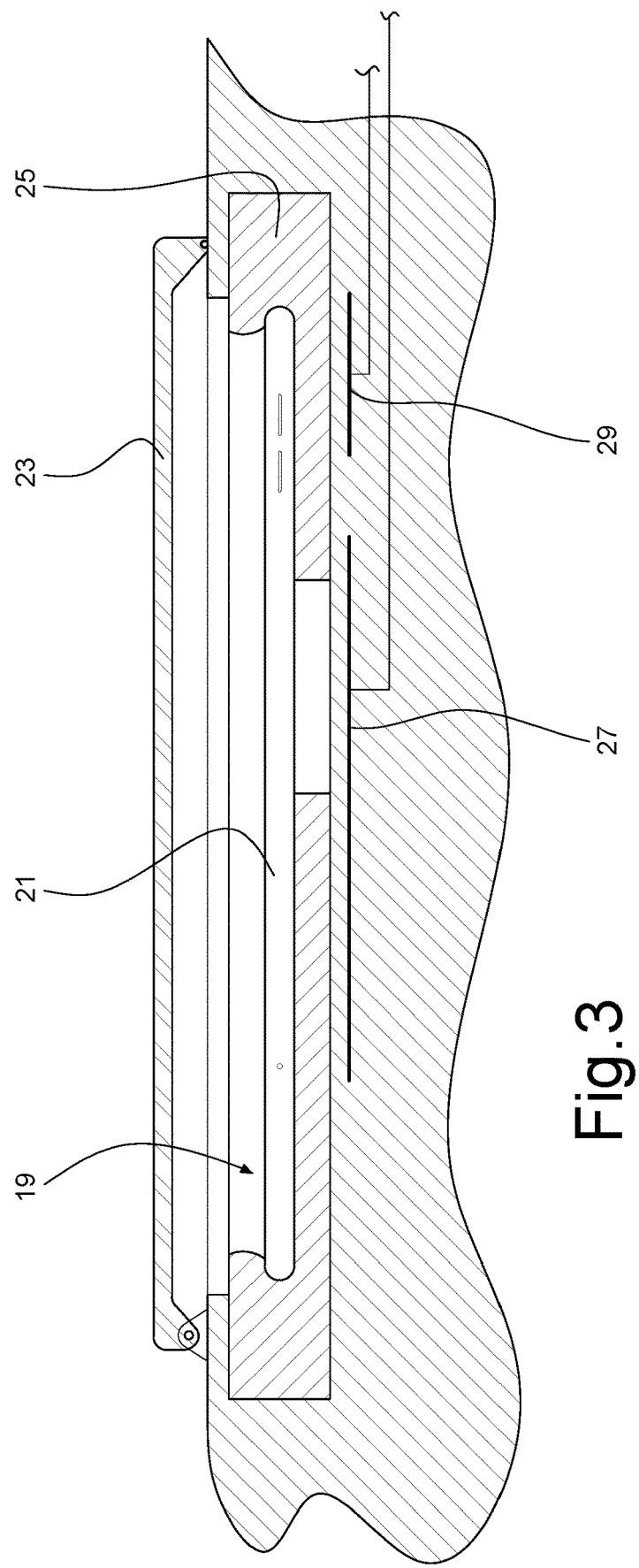
FIG. 3 shows a section of a housing for a mobile device that can be combined with the motorcycle.

In the embodiment illustrated in FIG. 2, with the handlebar 11 is associated a housing 19, which is provided in the panel integral with the handlebar 11. FIG. 3 shows a section of the housing 19, into which a smartphone 21 is inserted. The housing 19 can advantageously be closed by a cover, a covering or a door 23 (FIG. 3) to protect the smartphone 21, for example from rain or from accidental impacts. The door 23 is advantageously transparent, so as to allow the user to view the screen of the smartphone 21, as shown in FIG. 2. The door 23 can be provided with a closing system, to prevent the smartphone 21 from accidentally falling out, for example in the event of dynamic stresses occurring while the motorcycle 1 is traveling. In other embodiments, not illustrated, the smartphone 21 can be housed in a sort of pocket provided with a transparent wall to allow viewing of the screen of the smartphone. Said pocket (not illustrated) allows lateral insertion of the smartphone through an opening of the pocket to a limit stop position in which the smartphone is almost completely inserted into the pocket. If necessary, release means of the smartphone can be provided to facilitate removal of the smartphone from the pocket once the vehicle is parked.

Advantageously, the motorcycle 1 can comprise, for example, a warning light and/or horn, to inform the driver of the presence of the smartphone on board the motorcycle when one of the following conditions occurs: switching off the engine of the motorcycle, interruption of the power supply to the dashboard, motorcycle placed on the kickstand. In this way, the driver is informed of the fact of having forgotten the smartphone 21 on the motorcycle 1. The warning device is operatively connected to the electronic control unit of the motorcycle 1 as described in more detail below. In some embodiments, the warning device can be activated when the electronic control unit detects an active connection with the smartphone 21 and the simultaneous occurrence of at least one of the aforesaid conditions. In some embodiments, a presence sensor, or another detection means, for example a simple button for detecting the presence of the smartphone 21 in its housing 19, can be provided. In this case, the presence of the smartphone 21 is indicated even if it is switched off or not connected to the electronic control unit.

Advantageously, elements adapted to retain and/or protect the smartphone 21 can be provided inside the housing 19. For example, FIG. 3 schematically shows an inner covering 25 made of elastomeric material, preferably of expanded elastomeric material, which can deform to accommodate and retain the smartphone 21 with slight peripheral pressure inside the housing. The covering 25 can be sufficiently pliable to adapt to the different shapes and sizes of various smartphones 21, without the need to substitute the covering. In some cases, the covering 25 can be replaceable, for example in the event of damage or wear, or also to accommodate different smartphone models, with variations in size and/or shape that cannot be accommodated in a single covering 25.

The use of a pliable covering, typically made of expanded elastomeric material, is a possible solution to the need to retain and protect the smartphone while the vehicle is traveling. However, other solutions, such as the use of snap fastening blocking devices, or other suitable means, would also be possible.

A system for charging the battery of the smartphone 21 can be associated with the housing 19. To avoid the need to connect the smartphone 21 to a cable, battery charging can take place with an induction supply system, indicated schematically with 27. The induction supply system 27 is universal and can power smartphones of different brands without the need for power cable adaptors.

An electronic interface, adapted to interface the electronic control unit of the motorcycle 1 with the smartphone 21 housed in the housing 19, is also associated with the housing 19. In some embodiments, the electronic interface can comprise an antenna 29, for example a Bluetooth antenna or a Wi-Fi antenna adapted to transfer data between the electronic control unit of the motorcycle 1 and the smartphone 21.

As will be clarified below, by means of the electronic interface between electronic control unit and smartphone 21 it is possible to configure and use the latter as supplementary and integrating on-board instrument relative to the instruments installed on the dashboard 13 of the motorcycle. This offers many advantages. Firstly, it simplifies the structure of the dashboard 13, eliminating the need to provide it with additional instruments to those indicated as mandatory by current legislation. In fact, the information to be made available to and viewable by the user will appear on the screen of the smartphone. In this way the cost of manufacturing the motorcycle 1 is reduced.

Moreover, the possibility of representing only some supplementary instruments on the smartphone allows easier viewing by the driver while riding. To clarify the concept, the screens of smartphones are normally relatively small in size, for example a few inches, and consequently the graphic surface available is generally smaller than that used for the conventional analog instruments of motorcycle dashboards. Concentrating all the instruments of the vehicle on the screen of a smartphone would make it very difficult to view the information while riding. Smartphones are conceived to be read at a distance of around 30-40 cm from the eyes, while during riding the dashboard is almost double this distance from the driver's eyes. Consequently, the characters and images on the screen of the smartphone must be at least double the size to allow the instruments to be easily read while riding. This means that the screen of the smartphone cannot on its own represent all the instruments of the motorcycle, especially those mandatory by law, which must be clearly visible while riding. For this reason, the present invention divides the instruments of the motorcycle between the dashboard of the motorcycle 1 and the smartphone 21. In this way, the supplementary instruments represented on the smartphone are more visible.

Moreover, it is possible to provide the driver with a larger or smaller number of control and management functions by means of the smartphone through suitable programming of the electronic control unit, without the need to produce different versions of the same motorcycle. Therefore, it will be possible to customize the instruments viewed on the smartphone 21 according to the driver's needs. For example, a sports driver could desire a revolution counter while a city driver prefers traffic information, which could be viewed by means of a navigation function.

It is also possible to overcome the problem of rapid obsolescence of the on-board instruments of motorcycles. In fact, it is sufficient to use different more advanced smartphones 21 to obtain increased or additional functions, if necessary simply reprogramming the electronic control unit, which can take place, for example, during servicing or vehicle inspection of the motorcycle 1.

Figure 4:
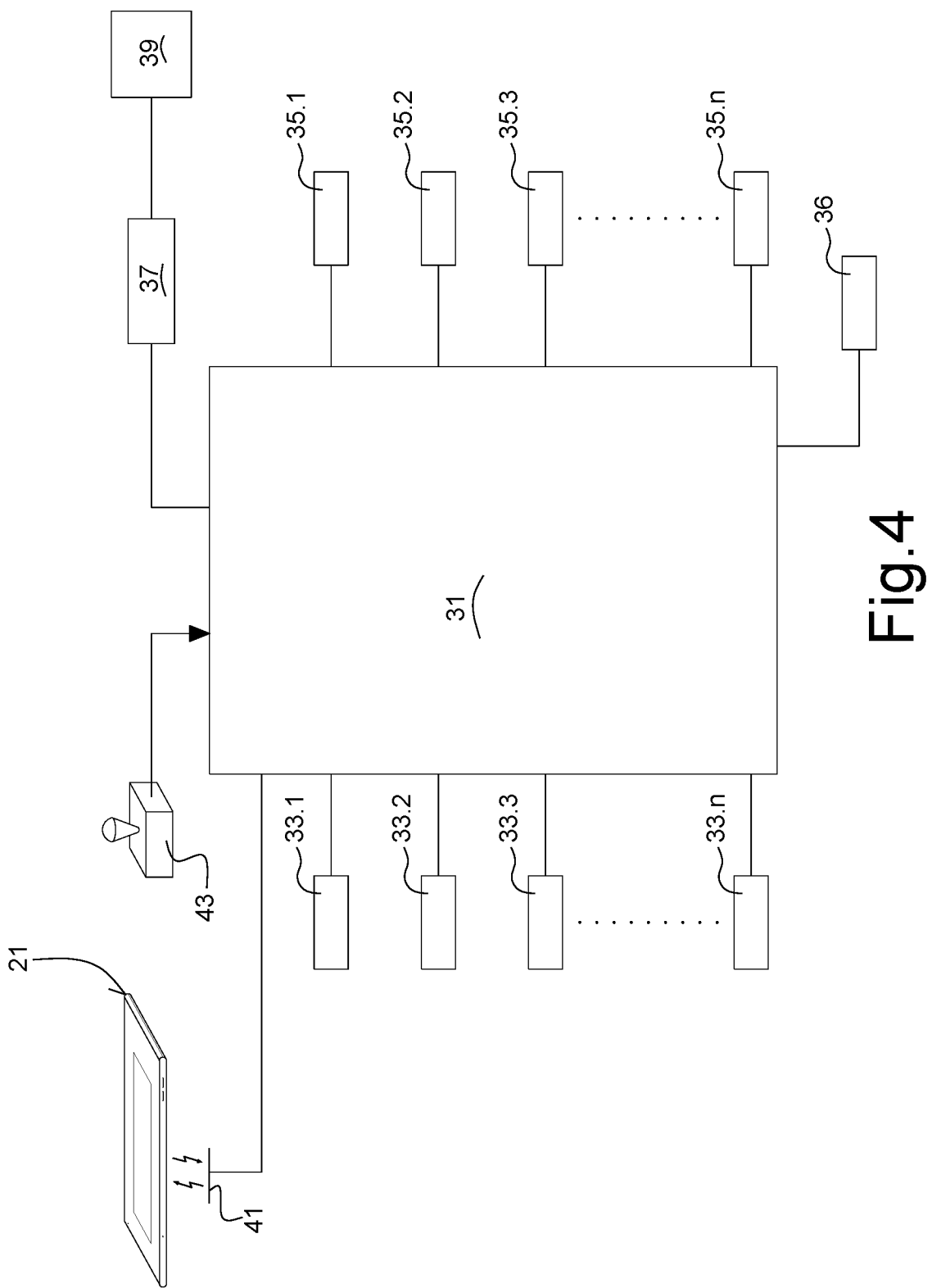
FIG. 4 shows a functional block diagram of the control unit and of the connections to the sensors and to the on-board instruments.

FIG. 4 shows a functional block diagram of an electronic control unit 31 on board the motorcycle 1, with which instruments, such as sensors, transducers, actuators, or generic instruments adapted to detect one or more operating parameters or conditions of the motorcycle or parts thereof, are interfaced. Some of these instruments are represented schematically by the functional blocks 33.1, 33.2, . . . 33.$n$ The instruments 33.1 . . . 33.$n$ can provide the electronic control unit 31 with information on the status of the various devices, apparatus, components or assemblies on board the motorcycle 1. By way of non-limiting example, the instruments 33.1 . . . 33.$n$ can comprise the following: a transducer of the fuel level in the tank; a speed transducer; a sensor for direct or indirect detection of the tire pressure; a thermometer for detecting the temperature of the lubricant; a pressure transducer for measuring the pressure of the lubricant, an odometer; a coolant temperature sensor (when the motorcycle has a liquid rather than air cooling system); sensors for detecting whether lamps and lights, such as position lights, dipped beam, full beam, fog lights, direction indicators, are switched on or off; a flow meter for measuring fuel consumption; one or more accelerometers; a tilt sensor.

Moreover, transducers or other control members 35.1, 35.2, . . . 35.$n$ can be associated with the electronic control unit 31 to transfer commands or operating settings for one or more devices or assemblies of the motorcycle 1. By way of non-limiting example, by means of the transducers or other control members 35.1, . . . 35.$n$ the following functions of the motorcycle 1 can be implemented: setting of the behavior of the engine 39 (sport, comfort, eco mode, etc.) by means of the control unit 37 of the engine 39; setting of the behavior of one or more suspensions (in sport, comfort, normal mode, etc.), by means of actuators of the suspensions; setting of the behavior of the automatic transmission, if present (in sport, comfort, eco mode, etc.); enabling or disabling of the quick shifter.

As mentioned above, the motorcycle 1 can be provided with an alarm system that warns the user of the presence of the smartphone in the housing 19 when given conditions occur, for example switching off the engine, placing the motorcycle 1 on the kickstand, interrupting the power supply to the dashboard. The diagram of FIG. 4 illustrates a generic warning device 36, for example a warning horn and/or warning light, that generates an alarm signal controlled by the electronic control unit 31 based on the combination of the aforementioned conditions. The presence of the smartphone 21 can be detected in any suitable way, but preferably so as to inhibit the emission of an alarm when the smartphone has been removed from the housing 19 thereof, even if still connected to the electronic control unit 31. For this purpose, a detection member of the physical presence of the smartphone 21 in the housing can be associated with said housing 19.

The electronic control unit 31 can be connected to the aforementioned devices directly or indirectly, for example by means of connection to a further control unit. For example, the motorcycle 1 can be provided with a controller 37 of the engine 39 (see diagram of FIG. 4). In this case, the electronic control unit 31 can dialog with the controller 37 in order to exchange data with the controller 37 of the engine and manage the engine 39 of the motorcycle 1. Based on the setting selected by the user by means of the smartphone 21, it is possible to operate the engine in one of various selectable modes (sport, comfort, eco, etc.). Similar settings can be selected for the suspensions, for example.

The electronic control unit 31 is interfaced by means of an electronic interface 41 with the smartphone 21 when this is inserted in its housing 19.

The smartphone 21 can be provided with a suitable application to dialog with the electronic control unit 31 and therefore display on its screen the information relating, for example, to the reading of one or more operating parameters or states of the motorcycle 1, if necessary with the possibility of selecting one or more consecutive screenshots if all the information required cannot be viewed on a single screenshot.

One or more pages that can be viewed on the screen of the smartphone 21 can be used to select one or more behaviors of components of the motorcycle, such as engine, transmission and suspensions.

The display logic of the information and of scrolling of the video screens can be the same as that already provided for on the on-board instruments di motor vehicles provided with a large number of functions. The application of the smartphone can if necessary by adapted to organize a plurality of screenshots, each of which groups together a certain amount of information organized and structured according to the user's needs, who in this way can prepare a kind of "pages" that can be browsed, i.e. viewed in sequence on the screen and each of which contains, if necessary with a distribution that can be set by the user, a certain amount of information. The information is displayed on the screen of the smartphone 21 by means of a suitable graphical user interface.

By means of the electronic interface 41 between the electronic control unit 31 and the smartphone 21 it is also possible to display on the screen thereof one or more video screens for activation/deactivation, control, selection or operation of one or more operating modes or functions. For example, it is possible to display on the screen of the smartphone a video screen by means of which it is possible to set the behavior of an automatic transmission, the behavior of the suspensions, the behavior of the engine, or other selectable operating modes, for example the activation or deactivation of the quick-shifter, where present.

The smartphone 21 is normally equipped with a touch screen. However, this cannot be used practically by the user for a series of reasons. Firstly, the housing 19 is advantageously provided with a cover 23 that makes the surface of screen of the smartphone 21 inaccessible. Moreover, the user could be wearing gloves and in any case interaction with the smartphone by means of the touch screen could be dangerous while riding, as the user would need to release at least one of the grips 11.1 of the handlebar 1.

In order to make interaction between user and smartphone practical and safe, the handlebar 11 can be provided with an interaction member 43 (see FIGS. 2 and 4) that allows the user to interact with the smartphone 21. In the example illustrated, the interaction member 43 comprises a joy-stick. The interaction member 43 is connected to the electronic control unit 31 and allows controls to be given to the smartphone 21 through the electronic control unit 31 and the electronic interface 41.

The interaction member 43 is placed adjacent to one of the grips 11.1 of the handlebar 11, so that the user can maneuver it without removing the hand from the grip of the handlebar and thus continuing to safely control the motorcycle 1.

For example, with the joy-stick it is possible to give upward or downward, left and right movements to a cursor moving on a graphical user interface (GUI) displayed on the screen of the smartphone 21. The joy-stick can be used to act on the graphical user interface of the smartphone 21 substituting contact on the screen with a pressure control on the lever of the joy-stick or on another button of the interaction member 43.

In some embodiments, the interaction member 43 can be used to scroll (with an upward or downward movement, for example) a list of selectable pages and to open, for example with a pressure control, a selected page, on which information relating to the driving conditions can appear, such as instantaneous speed, average speed, instantaneous fuel consumption, average fuel consumption, length of route traveled, total number of kilometers traveled by the motorcycle, gear engaged, tire pressure, oil temperature, oil pressure.

One or more pages can be provided to display on the graphical user interface the possibility of selecting one or more operating modes of one or more components of the motorcycle 1, such as the transmission, the suspensions and the engine. By means of the interaction member 43, the user can select the desired function and set it according to the desired driving conditions (for example: sport, comfort or eco behavior of the engine; sport, comfort or eco behavior of the automatic transmission, sport, comfort or normal behavior of the suspensions) using the interface member.

The interaction member 43 also allows the user to access the functions of the smartphone, and in particular to manage calls, messages, music and multimedia files, to access the Internet, to manage satellite navigation functions available by means of the smartphone, and in general to make use of any function with which the smartphone is provided.

Interfacing of the smartphone 21 with tilt sensors and/or with accelerometers with which the motorcycle 1 is provided can allow, by means of suitable programming of the electronic control unit 31, emergency calls to be made by means of the smartphone 21 when the signals supplied by these sensors indicate an accident.

The invention has been described in terms of various specific embodiments. However, it will be clear to those skilled in the art that many modifications, changes and omissions are possible without departing from the spirit and the scope of the invention, defined in the appended claims.

The invention claimed is:

1. A ride-on saddle vehicle comprising:
   a frame;
   at least one rear drive wheel and at least one front steered wheel associated with a handlebar to control steering of the front steered wheel;
   a dashboard with a first set of instruments, integrated with the handlebar;
   an electronic control unit of the vehicle, connected to a plurality of electronic devices on board the vehicle;
   a housing associated with the handlebar for a smartphone of a user of the vehicle; and
   an electronic interface adapted to interface the electronic control unit with the smartphone inserted in the housing; wherein the electronic control unit is adapted to provide the smartphone, by means of said electronic interface, with information viewable by the user on the smartphone and relating to a plurality of functions of the vehicle; wherein the dashboard and the housing are placed on the handlebar of the vehicle and integral therewith.

2. The vehicle of claim 1, wherein the electronic devices on board the vehicle comprise at least one of: a sensor, a transducer, an actuator.

3. The vehicle of claim 1, wherein the dashboard and the housing are placed on the handlebar one next to the other.

4. The vehicle of claim 1, wherein the housing comprises mechanical retaining members of the smartphone and a transparent closure.

5. The vehicle of claim 1, wherein the dashboard has the following instruments: speedometer, full beam warning light, position light warning light, indicator lights, low fuel warning light.

6. The vehicle of claim 1, wherein the control unit is adapted to provide, by means of the electronic interface, the smartphone with information adapted to view, on a screen of the smartphone and by means of a graphical user interface, one or more of the following functions or information: a revolution counter, an odometer, a front fog lights warning light, a rear fog lights warning light, a dipped beam warning light, a fuel level indicator, an indicator of the tire pressure based on direct or indirect information.

7. The vehicle of claim 1, wherein the control unit is adapted to provide the smartphone with information to record and view voyage data.

8. The vehicle of claim 1, further comprising an interaction member adapted to allow the user to interact with the smartphone.

9. The vehicle of claim 8, wherein said interaction member comprises a control member placed on the handlebar at a distance from the grips of the handle-bar that allows operation of the control member without removing one's hands from the handlebar.

10. The vehicle of claim 8, wherein said interaction member comprises a joy-stick.

11. The vehicle of claim 5, wherein the control unit is programmed to view on a screen of the smartphone a graphical user interface by means of which the user can set, by means of the interaction member, one or more of the following functions: the behavior of the engine; the behavior of the vehicle suspensions; enabling and disabling of a quick shift function; the behavior of the automatic transmission; management of multimedia contents of the smartphone; management of telephone calls or messaging.

12. The vehicle of claim 1, wherein the control unit is adapted to start, by means of the smartphone, an emergency call as a function of signals coming from one or more sensors installed on the vehicle and interfaced with the control unit.

13. The vehicle of claim 1, further comprising warning horn/light interfaced with the electronic control unit, adapted to indicate the presence of the smartphone in said housing when at least one condition indicating that the driver has moved away from the vehicle occurs.

14. The vehicle of claim 2, wherein the dashboard and the housing are placed on the handlebar one next to the other.

15. The vehicle of claim 2, wherein the housing comprises mechanical retaining members of the smartphone and a transparent closure.

\* \* \* \* \*